United States Patent
Gustafsson et al.

(10) Patent No.: US 7,975,529 B2
(45) Date of Patent: Jul. 12, 2011

(54) METHOD OF DISCOVERING LEAKAGE IN A HEAT EXCHANGER

(75) Inventors: Mats Gustafsson, Lund (SE); Max Leufstedt, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 513 days.

(21) Appl. No.: 12/083,562

(22) PCT Filed: Nov. 30, 2006

(86) PCT No.: PCT/SE2006/001378
§ 371 (c)(1),
(2), (4) Date: Apr. 14, 2008

(87) PCT Pub. No.: WO2007/064285
PCT Pub. Date: Jun. 7, 2007

(65) Prior Publication Data
US 2009/0158818 A1    Jun. 25, 2009

(30) Foreign Application Priority Data
Dec. 2, 2005 (SE) ..................... 0502642

(51) Int. Cl.
*G01M 3/32* (2006.01)
(52) U.S. Cl. ........................ 73/40.5 R; 73/40
(58) Field of Classification Search .......... 73/40, 40.5 R
See application file for complete search history.

(56) References Cited

U.S. PATENT DOCUMENTS

| | | | |
|---|---|---|---|
| 4,138,856 A | 2/1979 | Orlowski | |
| 6,923,043 B2 * | 8/2005 | Rabelle | 73/40.5 R |
| 2004/0129061 A1 * | 7/2004 | Rabelle | 73/40 |

FOREIGN PATENT DOCUMENTS

| | | | | |
|---|---|---|---|---|
| EP | 1 022 552 A2 | 7/2000 | | |
| JP | 59-215597 | * 12/1984 | ................ | 165/11.1 |
| JP | 60-218593 A | 11/1985 | | |
| JP | 2002-296140 A | 10/2002 | | |
| WO | WO 02/25238 A1 | 3/2002 | | |
| WO | WO 02/086438 A1 | 10/2002 | | |
| WO | WO 03/016847 A2 | 2/2003 | | |

OTHER PUBLICATIONS

International Search Report (PCT/ISA/210).
English language translation of Japanese Office Action issued Aug. 24, 2010 by the Japanese Patent Office in corresponding Japanese Patent Application No. 2008-543236.

* cited by examiner

*Primary Examiner* — Daniel S Larkin
(74) *Attorney, Agent, or Firm* — Buchanan Ingersoll & Rooney PC

(57) ABSTRACT

A method of discovering leakage in a heat exchanger, wherein the method is carried into effect on an intact heat exchanger which, together with surrounding conduits, is filled with water. The heat exchanger preferably has requisite pressure indicators mounted between each section, as well as requisite shut-off valves. The method comprises applying in each section of the heat exchanger an excess pressure on one side which is enclosed there, while the other side is at normal pressure. The pressure is enclosed during a period of time and is monitored during this period of time.

20 Claims, 1 Drawing Sheet

METHOD OF DISCOVERING LEAKAGE IN A HEAT EXCHANGER

TECHNICAL FIELD

Figure 1:
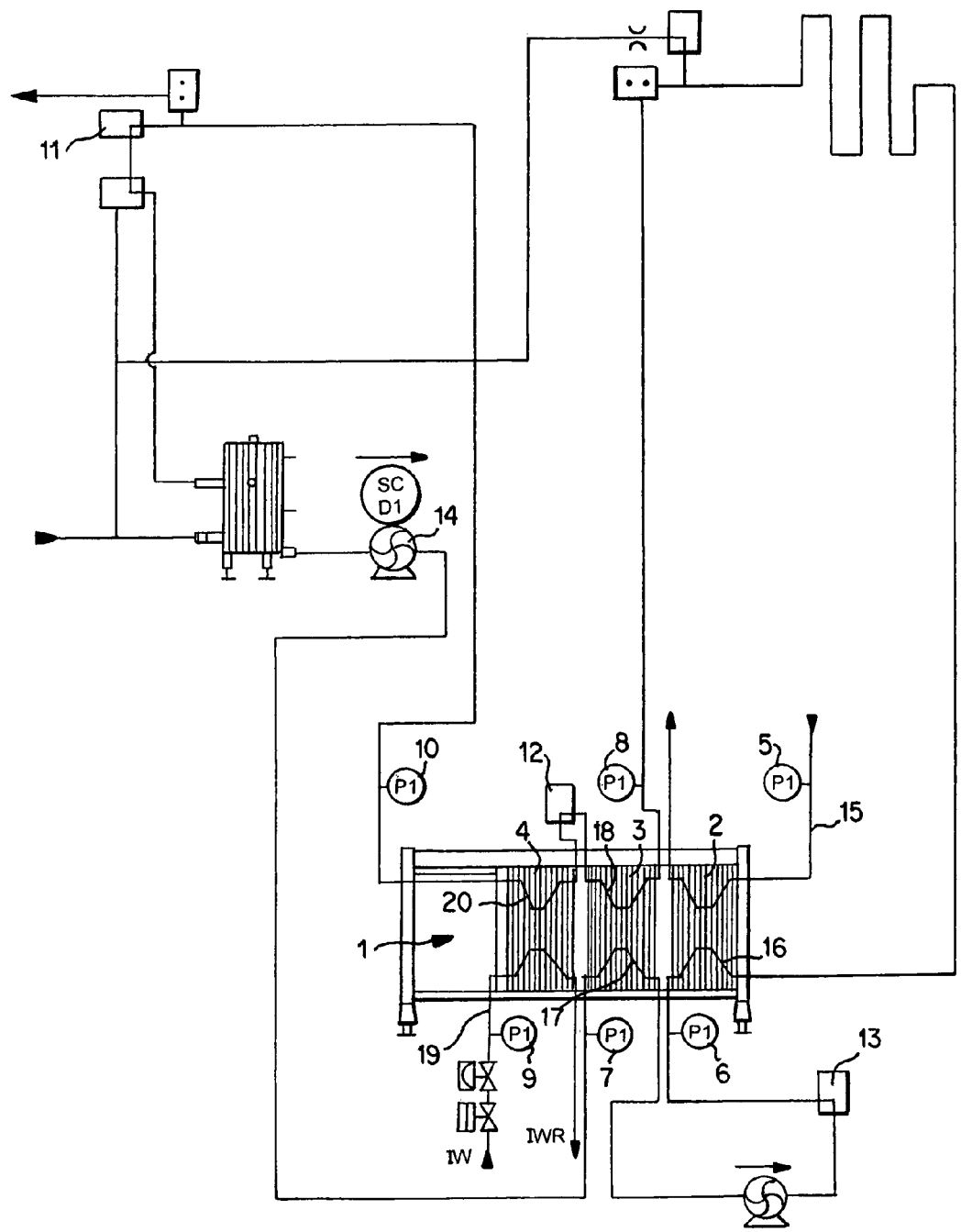

The present invention relates to a method of discovering leakage in a heat exchanger, the heat exchanger being, together with surrounding conduits, filled with water, and the method comprising the steps that, in each section of the heat exchanger, an excess pressure is applied on the one side and is closed in across the section during a period of time, while the other side in the section is at normal pressure, and that the pressure difference is monitored during the period of time.

BACKGROUND ART

In order to heat treat liquid products use is made of various types of heat exchangers in indirect heating. The most common types of heat exchangers are plate heat exchangers and tube heat exchangers. The method according to the present invention is applicable to both types, but is preferably intended for plate heat exchangers. Heat exchangers are also used to a considerable extent within the food industry, such as in dairies and in juice factories. Depending upon the temperature to which the product is heated, a pasteurised or a sterile product will be obtained.

A heat exchanger normally consists of different sections which all have two sides—one side for product and one side for a heating medium, such as water or other liquid at different temperature, or steam. Alternatively, the sections may be disposed regeneratively, so that a cold product is heated up by an already heated product.

It is naturally always desirable that both of the sides in each respective section are kept separate and discrete, but within the food industry this is extremely important. Otherwise, a ready-treated product may be reinfected by a heating medium or by untreated product.

Various methods of discovering leakage in a heat exchanger have been used with the passage of time, such as saline solutions and coloured water on the one side in a section and normal water on the other side, whereafter, by conductivity measurements of alternatively ocular observations, it has been possible to discover any possible leakage. These methods take up considerable time and another of their drawbacks is that it is difficult to discover minor leakage.

A further method is described in international Patent Specification WO 02/086438. This method implies that the heat exchanger is connected to an external unit with the aid of which different pressures are applied on the different sides in a section in a heat exchanger. The unit makes for the simultaneous testing of several sections. This method is effective as regards discovering minor leakage, but it is also time-consuming and involves external service costs, for example, for a dairy.

OBJECTS OF THE INVENTION

One object of the present invention is to realise a method which is rapid and reliable.

A further object of the present invention is to realise a method which may be carried out routinely, for example in connection with washing of the plant.

SOLUTION

These and other objects have been attained according to the present invention in that the method of the type described by way of introduction has been given the characterising feature that the method is carried out on an intact heat exchanger with requisite pressure indicator mounted between each section, as well as requisite shut-off valves.

Preferred embodiments of the present invention have further been given the characterising features as set forth in the appended subclaims.

BRIEF DESCRIPTION OF THE ACCOMPANYING DRAWING

One preferred embodiment of the present invention will now be described in greater detail hereinbelow, with reference to the accompanying Drawing. In the accompanying Drawing:

FIG. 1 shows a part of a flow diagram with a heat exchanger.

The drawing shows only those details and parts essential to an understanding of the present invention, and the remaining part of the plant in which the heat exchanger is included has been omitted.

DESCRIPTION OF PREFERRED EMBODIMENT

The method according to the present invention is intended to be employed to detect leakage in a heat exchanger. The method is primarily intended for a plate heat exchanger, as shown in FIG. 1, but the method may also be used for other types of heat exchangers, such as tube heat exchangers, which process liquid foods.

The method may be employed in connection with an existing heat exchanger without it needing to be disconnected or without the need to disconnect connecting conduits. Preferably, the method may be used directly in conjunction with washing of the plant in which the heat exchanger is included. Directly in conjunction with the washing, the heat exchanger and connecting conduits are filled with rinsing water from the washing operation. Naturally, the method may be carried into effect on other occasions, for example, before start up of production, but then conduits and the heat exchanger must first be filled with water.

Given that the method may be carried on an intact heat exchanger, this implies that it is rapid, approx. 30 minutes. This implies that the method may be employed routinely at, for example, a dairy, which contributes in increased product safety. Previous methods have involved the separate planning of service inputs which have taken up to half a day to complete.

The heat exchanger 1 in FIG. 1 has three sections 2, 3, 4, but the method may naturally also be employed for both more and fewer sections 2, 3, 4. Each section 2, 3, 4 is provided with respective pressure indicator 5-10 indicators 5-6, 7-8, 9-10. The pressure indicators 5-10 are preferably electric, but also other types of pressure indicators 5-10 may occur. The pressure indicators 5-10 emit signals to the master or control unit of the plant. Conventional heat exchangers 1 may perhaps need to be retrofitted with pressure indicators 5-10, but in those cases where one or more of the sections 2, 3, 4 is used regeneratively, pressure indicators 5-10 must already be in position in compliance with the legislation of certain countries.

For carrying the method into effect, a number of shut-off valves 11, 12, 13 are also required. A pump 14 which normally pumps product into the heat exchanger 1 is also used in the method. The pump 14 which normally consists of a circulation pump must be frequency controlled.

In the first section 2 there is, on production, hot water on one side which enters into the heat exchanger 1 through the conduit 15. The water pressure in this conduit 15 is monitored using the pressure indicator 5. On the other side in the first section 2, there is a part 16 of the product conduit which is monitored using the pressure indicator 6.

In the second section 3, there are product conduits on both sides. The upstream side has a part 17 of the product conduit which is monitored using the pressure indicator 7. The downstream side has another part 18 of the product conduit which is monitored using the pressure indicator 8.

In the third section 4 there is, on production, on the one side ice water which enters into the heat exchanger 1 through the conduit 19. The water pressure in this conduit 19 is monitored using the pressure indicator 9. On the other side in the third section 4, there is a part 20 of the product conduit which is monitored using the pressure indicator 10.

When the method is to be carried into effect, the heat exchanger 1 and connecting conduits are to be filled with water. The pressure of the water through the heat exchanger 1 and the conduits should be approx. 2 bar, which is normal pressure on production and washing.

When the method is to be put into effect, the first step is to close the shut-off valve 11. Thereafter, the pump 14 is accelerated in order to give a pressure increase to the conduit system. When the pressure indicator 10 shows approx. 6 bar, the valve 12 closes so that an excess pressure of approx. 67 bar is enclosed on the downstream side in the third section 4.

Thereafter, the pump 14 is decelerated somewhat and when the pressure indicator 8 shows approx. 5.5 bar, the shut-off valve 13 closes so that an excess pressure of approx. 5.5 bar is enclosed on the downstream side in the second section 3 of the heat exchanger 1.

The pump 14 is decelerated slightly further and when the pressure indicator 6 shows approx. 5.5 bar, the pump 14 is completely decelerated. An excess pressure of approx. 5.5 bar has now been enclosed on the upstream side in the first heat exchanger section 2.

The downstream side in the first section 2 and the upstream sides in the second and third sections 3, 4 have a normal pressure of approx. 2 bar, which can be read off with the aid of the pressure indicators 5, 7 and 9, respectively.

The values of the pressure indicators 5-10 are registered in the master or control unit of the plant during a given, predetermined period of time, for example 30 minutes. The entire read-off period may suitably be printed out so that there will by such means be obtained different graphs of the pressurised sides of each respective section 2, 3, 4. By pressurising the different sections 2, 3, 4 in steps, it is simple to distinguish the different sections 2, 3, 4 from one another. Steps between the different sections may be larger or smaller than 0.5 bar. However, the difference must be distinguishable on a graph.

If leakage were to occur in some section 2, 3, 4, the pressure in the pressurised side will fall and begin to approach the pressure in the unpressurised side. Large leakages show a rapid pressure equalisation. For minor leakage it is important to use a relatively long measurement period, since the pressure equalisation in such a case is considerably slower.

The excess pressure is preferably laid on the downstream side of the heat exchanger 1 and preferably on the main conduit through the heat exchanger 1, i.e. on that side where the product is led.

After the carrying out of the method, the shut-off valves 11, 12, 13 are opened, the water is emptied from the conduits and heat exchanger 1 and, if no leakage is present, the heat exchanger 1 is now ready for production.

In those cases where the heat exchanger 1 has more or fewer sections, more or fewer pressure indicators 5-10 and shut-off valves 11, 12, 13 must naturally be used so that it is possible in a corresponding manner to enclose an excess pressure on one side of each respective section 2, 3, 4 in the heat exchanger 1.

As will have been apparent from the foregoing description, the present invention realises a method for discovering leakage which is rapid and reliable. Since the method is carried out on an intact heat exchanger, the method may be put into effect routinely, preferably in conjunction with washing of the plant. Given that the leakage monitoring may be carried out often and regularly, this contributes to increased product safety and reliability which is of vital importance above all in the food industry.

What is claimed is:

1. A method of discovering leakage in a heat exchanger filled with water, the heat exchanger comprising at least first and second sections each possessing one side and an opposite side, the method comprising:
    operating a pump to apply first excess pressure on the one side of the first section in the heat exchanger;
    closing a first shut-off valve positioned between the one side of the first section and the one side of the second section, when a first pressure indicator indicates that the pressure on the one side of the first section has reached a first excess pressure, to enclose the first excess pressure on the one side of the first section;
    applying second excess pressure on the one side of the second section in the heat exchanger while the first shut-off valve is closed;
    closing a second shut-off valve positioned between the one side of the second section and the pump, when a second pressure indicator indicates that the pressure on the one side of the second section has reached a second excess pressure, to enclose the second excess pressure on the one side of the second section;
    maintaining pressure on the opposite side of the first section less than the first excess pressure, and maintaining pressure on the opposite side of the second section less than the second excess pressure;
    monitoring a pressure difference between the one side and the opposite side of the first section, and monitoring a pressure difference between the one side and the opposite side of the second section; and
    using results of the monitoring of the pressure differences to discover a leakage in the heat exchanger.

2. The method as claimed in claim 1, wherein the first excess pressure is approx 6 bar.

3. The method as claimed in claim 1, wherein the first excess pressure is different from the second excess pressure.

4. The method as claimed in claim 1, wherein the first excess pressure is greater than the second excess pressure.

5. The method as claimed in claim 1, wherein the one side of the first and second sections is a downstream side of the first and second sections where product is led.

6. The method as claimed in claim 1, wherein the pressure on the opposite side of the first section is determined by a third pressure indicator, and the pressure on the opposite side of the second section is determined by a fourth pressure indicator.

7. The method as claimed in claim 1, wherein the maintaining of the pressure on the opposite side of the first section and the opposite side of the second section comprises maintaining the same pressure on the opposite side of the first section and the opposite side of the second section.

8. A method of discovering leakage in a heat exchanger filled with water, the heat exchanger comprising at least first and second sections each possessing one side and an opposite side, the method comprising:
- applying first excess pressure on the one side of the first section in the heat exchanger;
- closing a valve positioned between the one side of the first section and the one side of the second section in the heat exchanger to enclose the first excess pressure on the one side of the first section;
- applying second excess pressure on the one side of the second section in the heat exchanger;
- closing another valve upstream of the one side of the second section to enclose the second excess pressure on the one side of the second section;
- maintaining pressure on the opposite side of the first section less than the first excess pressure, and maintaining pressure on the opposite side of the second section less than the second excess pressure;
- monitoring a pressure difference between the one side and the opposite side of the first section, and monitoring a pressure difference between the one side and the opposite side of the second section; and
- using results of the monitoring of the pressure differences to discover a leakage in the heat exchanger.

9. The method as claimed in claim 8, wherein the first excess pressure is approx 6 bar.

10. The method as claimed in claim 8, wherein the first excess pressure is different from the second excess pressure.

11. The method as claimed in claim 8, wherein the first excess pressure is greater than the second excess pressure.

12. The method as claimed in claim 8, further comprising a third section possessing one side and an opposite side, and further comprising determining the pressure on the one side of the first section by way of a first pressure indicator, determining the pressure on the opposite side of the first section by way of a second pressure indicator, determining the pressure on the one side of the second section by way of a third pressure indicator, determining the pressure on the opposite side of the second section by way of a fourth pressure indicator, determining the pressure on the one side of the third section by way of a fifth pressure indicator, and determining the pressure on the opposite side of the third section by way of a sixth pressure indicator.

13. The method as claimed in claim 8, wherein the maintaining of the pressure on the opposite side of the first section and the opposite side of the second section comprises maintaining the same pressure on the opposite side of the first section and the opposite side of the second section.

14. A method of discovering leakage in a heat exchanger filled with water, the heat exchanger comprising at least first and second sections each possessing one side and an opposite side, the method comprising:
- applying first excess pressure on the one side of the first section in the heat exchanger;
- enclosing the first excess pressure on the one side of the first section;
- applying second excess pressure on the one side of the second section in the heat exchanger after enclosing the first excess pressure on the one side of the first section;
- enclosing the second excess pressure on the one side of the second section;
- maintaining pressure on the opposite side of the first section less than the first excess pressure, and maintaining pressure on the opposite side of the second section less than the second excess pressure;
- monitoring a pressure difference between the one side and the opposite side of the first section, and monitoring a pressure difference between the one side and the opposite side of the second section; and
- using results of the monitoring of the pressure differences to discover a leakage in the heat exchanger.

15. The method as claimed in claim 14, wherein the first excess pressure is approx 6 bar.

16. The method as claimed in claim 14, wherein the first excess pressure is different from the second excess pressure.

17. The method as claimed in claim 14, wherein the first excess pressure is greater than the second excess pressure.

18. The method as claimed in claim 14, further comprising a third section possessing one side and an opposite side, and further comprising determining the pressure on the one side of the first section by way of a first pressure indicator, determining the pressure on the opposite side of the first section by way of a second pressure indicator, determining the pressure on the one side of the second section by way of a third pressure indicator, determining the pressure on the opposite side of the second section by way of a fourth pressure indicator, determining the pressure on the one side of the third section by way of a fifth pressure indicator, and determining the pressure on the opposite side of the third section by way of a sixth pressure indicator.

19. The method as claimed in claim 14, wherein the maintaining of the pressure on the opposite side of the first section and the opposite side of the second section comprises maintaining the same pressure on the opposite side of the first section and the opposite side of the second section.

20. The method as claimed in claim 14, wherein the enclosing of the first excess pressure on the one side of the first section comprises closing a first valve, and the enclosing of the second excess pressure on the one side of the section comprises closing a second valve.

* * * * *